US008514865B2

(12) United States Patent
Sharma et al.

(10) Patent No.: US 8,514,865 B2
(45) Date of Patent: Aug. 20, 2013

(54) ASSIGNING WAN LINKS TO SUBFLOWS BASED ON WAN LINK CHARACTERISTICS AND APPLICATION PREFERENCES

(75) Inventors: Puneet Sharma, Palo Alto, CA (US); Sung-Ju Lee, Los Altos, CA (US); John T. Brassil, Los Gatos, CA (US); Kang G. Shin, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2330 days.

(21) Appl. No.: 10/835,404

(22) Filed: Apr. 30, 2004

(65) Prior Publication Data

US 2005/0243835 A1 Nov. 3, 2005

(51) Int. Cl.
*H04L 12/28* (2006.01)

(52) U.S. Cl.
USPC ........................ 370/395.42; 370/412; 709/232

(58) Field of Classification Search
USPC ................ 370/395.21, 395.42, 412; 709/232
See application file for complete search history.

(56) References Cited

U.S. PATENT DOCUMENTS

| | | | | |
|---|---|---|---|---|
| 2002/0186661 | A1 * | 12/2002 | Santiago et al. | 370/252 |
| 2003/0147408 | A1 | 8/2003 | Datta et al. | |
| 2003/0189932 | A1 * | 10/2003 | Ishikawa et al. | 370/392 |
| 2003/0223395 | A1 * | 12/2003 | Chitrapu | 370/338 |
| 2004/0001493 | A1 * | 1/2004 | Cloonan et al. | 370/395.42 |
| 2004/0042460 | A1 * | 3/2004 | Gruhl et al. | 370/395.4 |
| 2004/0073694 | A1 * | 4/2004 | Frank et al. | 709/232 |
| 2004/0184483 | A1 * | 9/2004 | Okamura et al. | 370/477 |

FOREIGN PATENT DOCUMENTS

| | | | |
|---|---|---|---|
| EP | 1328091 | | 7/2003 |
| EP | 1359720 | | 11/2003 |
| WO | WO/02/45013 | * | 6/2002 |

OTHER PUBLICATIONS

Hanks et al, Generic Routing, Encapsulation (GRE), Oct. 1994, Sysco Systems, 8 pages.*
Adiseshu, H. et al.,"A Reliable and Scalable Striping Protocol", in Proceedings of ACM SIGCOMM, Aug. 1996.
Apostolopoulos, J., "Error-Resilient Video Compression via Multiple State Streams", in Proceedings of VLBV, Oct. 1999.
ATM Forum, "Inverse Multiplexing for ATM Specification, version 1.0", Jul. 1997.
Bennett, J.C.R. et al., "Packet Reordering is Not Pathological Network Behavior", IEEE/ACM Trans. Networking, Dec. 1999.
Blanton, E., "On Making TCP More Robust to Packet Reordering", ACM SIGCOMM Computer Communication Review, Jan. 2002.
Bonding Consortium, "Interoperability Requirements for Nx56/64 kbit/s Calls", version 1.0, Sep. 1992.
Cabrera, L.F., et al. "Swift: Using Distributed Disk Striping to Provide High I/O Data Rates", Computing Systems, Dec. 1991.
Chen, P.M. et al., "RAID: High-Performance, Reliable Secondary Storage", ACM Computing Surveys, Jun. 1994.
Cruz, R.L. et al., "A Calculus for Network Delay, Part I: Network Elements in Isolation" IEEE Trans. Inform. Theory, Jan. 1991.
Duncanson, J., "Inverse Multiplexing", IEEE Comm Mag., Apr. 1994.

(Continued)

*Primary Examiner* — Ayaz Sheikh
*Assistant Examiner* — Mounir Moutaouakil

(57) ABSTRACT

WAN link preferences for subflows of an application flow are determined. The characteristics of WAN links operable to transmit the subflows are also determined. The WAN link preferences are compared to the WAN link characteristics, and the subflows are assigned to the WAN links based on the comparison.

33 Claims, 6 Drawing Sheets

(56) References Cited

OTHER PUBLICATIONS

Fredette, P.H., "The Past, Present, and Future of Inverse Multiplexing", IEEE Comm Mag., Apr. 1994.
Guttman, E., "Service Location Protocol" version 2, Jun. 1999.
Hanks, S., "Generic Routing Encapsulation Over IPv4 Networks", Oct. 1994.
Hsieh, H.Y., et al., "A Transport Layer Approach for Achieving Aggregate Bandwidths on Multi-homed Mobile Hosts", in Proceedings of ACM MobiCom, Sep. 2002.
Kravets, R. et al., "A Cooperative Approach to User Mobility", ACM SIGCOMM Computer Comm Review, Oct. 2001.
Liu, J.W.S., et al., "Imprecise Computations", IEEE, Jan. 1991.
Magalhaes, L. et al., "End-to-End Inverse Mulitplexing for Mobile Hosts", Journal of the Brazilian Computer Society, year of publication 2001.
Magalhaes, L. et al., "MMTP-Multiplexing Transport Protocol", ACM SIGCOMM-LA, Apr. 2001.
Magalhaes, L. et al., "Transport Level Mechanisms for Bandwidth Aggregation on Mobile Hosts", IEEE ICNP, Nov. 2001.
McCanne, S. et al., "Joint Source/Channel Coding for Multicast Packet Video", IEEE ICIP, Oct. 1995.
National Institute of Standards and Technology's NIST net., http://snad.ncsl.nist.gov/itg/nistnet, Jul. 20, 2005.
Netfilter, http://www.netfilter.org, Apr. 30, 2004.
NetIQ Corporation's Chariot, http://www.netiq.com/products/chr/default.asp, Apr. 30, 2004.
ns-2, The Network Simulator, http://www.isi.edu/nsnam/ns, Apr. 30, 2004.
Papadopouli, M. et al., "Connection Sharing in an Ad Hoc Wireless Network Among Collaborating Hosts", NOSSDAV, Jun. 1999.
Phatak, D.S. et al., "A Novel Mechanism for Data Streaming Across Multiple IP Links for Improving Throughput and Reliability in Mobile Environments", IEEE INFOCOM, Jun. 2002.
Schulzrinne, H. et al., "RTP: A Transport Protocol for Real-Time Applications", Internet Engineering Task Force, Jan. 1996.
Sklower, K. et al., "The PPP Multilink Protocol (MP)", Internet Engineering Task Force, Aug. 1996.
Snoeren, A.C., "Adaptive Inverse Multiplexing for Wide-Area Wireless Networks", IEEE GLOBECOM, Dec. 1999.
Traw, C.B.S. et al., "Striping Withing the Network Subsystem", IEEE Network, 1995.
Wang, Y. et al, "Multiple Description Coding Using Pairwise Correlating Transforms", IEEE Trans. Image Processing, Mar. 2001.
Woodburn, R.A. et al., "A Scheme for an Internet Encapsulation Procotol: Version 1", Internet Engineering Task Force, Jul. 1991.

* cited by examiner

ASSIGNING WAN LINKS TO SUBFLOWS BASED ON WAN LINK CHARACTERISTICS AND APPLICATION PREFERENCES

TECHNICAL FIELD

The technical field relates generally to communication systems for computer systems, and more particularly to assigning wide area network (WAN) links.

BACKGROUND

The Internet, as it has grown considerably in size and popularity, supports a significant number and types of applications. Diverse applications, such as streaming a video, downloading music, voice-over-IP, and web-based multi-user computer games or conferences are all available to users via the Internet.

As applications become more complex and demanding, it has become a challenge to effectively deliver the applications to users while maintaining quality of service. One of the key obstacles is the limited amount of bandwidth available. Due to high bandwidth requirements and intensive computations incurred by applications, such as multimedia applications and real-time voice and video applications, traditional unicast delivery techniques may not be able to meet the transmission demands of these types of applications and is not scalable to efficiently meet the demands of a large number of service providers and users.

The challenge of effectively delivering applications to users is further exasperated with respect wireless computing devices. Public, high-speed, Internet connectivity for the wireless devices is typically achieved by connection via a wireless local area network (LAN) interface, such as 802.11x or Bluetooth, to an access point which is connected to a high speed, wired connection. It remains unlikely, however, that deployment of access points will ever realize ubiquitous or even relatively broad geographical access. Even where access points are densely deployed, seamless roaming between access points remains a technical challenge and may not serve the business interests of either access point operators, venue owners or service providers. Furthermore, where access point coverage is broad, the bandwidth of the wired connection, which is typically about 1.5 Mb/s, is limited and possibly shared among a large group of users and unlikely to significantly increase in the foreseeable future.

An increasing number of the wireless devices are equipped with a wireless WAN interface, such as a 2.50 or later generation cellular link, as well as a wireless LAN interface. These wireless devices typically access the Internet via their own cellular WAN link instead of sharing a wired connection. However, the bandwidth of the cellular connection is still relatively limited, especially with respect to the LAN interface which may exceed the WAN bandwidth by one to three orders of magnitude. Furthermore, the user may incur heavy costs when using the cellular link for an extended period of time.

SUMMARY OF THE EMBODIMENTS

According to an embodiment, WAN link preferences for subflows of an application flow are determined. The WAN link preferences are associated with an application for which the application flow is generated. The characteristics of WAN links operable to transmit the subflows are also determined. The WAN link preferences are compared to the WAN link characteristics, and the subflows are assigned to the WAN links based on the comparison.

BRIEF DESCRIPTION OF THE DRAWINGS

Various features of the embodiments can be better appreciated, as the same become better understood with reference to the following detailed description when considered in connection with the accompanying figures, in which.

DETAILED DESCRIPTION OF THE EMBODIMENTS

In the following detailed description, references are made to the accompanying figures, which illustrate specific embodiments. Electrical, mechanical, logical and structural changes may be made to the embodiments without departing from the spirit and scope of the embodiments.

Piconets, as used herein, are groups of wireless mobile computing and communication devices that can form communities through their compatible high-speed LAN interfaces. Piconets may also include non-mobile computing devices, such as a desktop or server with a compatible LAN interface. Personal area networks (PANs) are also piconets. Bluetooth and 802.11x are examples of network protocols that can be used in piconets. Each piconet member may be connected to the Internet via a low-speed WAN link. According to an embodiment, a logical WAN link comprised of aggregated physical WAN links for each of the piconet members is created to increase the bandwidth of the WAN connection between the piconet members and the WAN, which may include the Internet. An inverse multiplexer is used in the WAN to stripe data across the physical WAN links to create the high-speed logical WAN link.

The physical WAN links are dynamic due to varying link characteristics and due to the ad hoc nature of the piconets. For example, WAN links may have different bandwidth, packet loss, packet delay, and jitter characteristics, and as members leave a piconet or join a piconet, WAN links are lost or added. Also, applications transmitting data via the WAN links to piconet members may have different WAN link preferences. A WAN link preference includes desired or optimum WAN link characteristics for transmitting an application flow or subflow. The WAN link preferences, as an example, may be related to the following metrics: minimum packet interarrival time, burstiness, multiple QoS levels, bandwidth, loss rate, delay, and jitter. A streaming video application may tolerate higher packet loss rates rather than higher packet delays, and thus may have WAN link preferences reflecting these tolerances. A non-real time data application may tolerate higher packet delays rather than higher packet loss rates, and thus may have WAN link preferences reflecting these tolerances. According to an embodiment, data striping techniques are provided that consider the dynamic link characteristics of WAN links and accommodate WAN link preferences for different applications.

Figure 1:
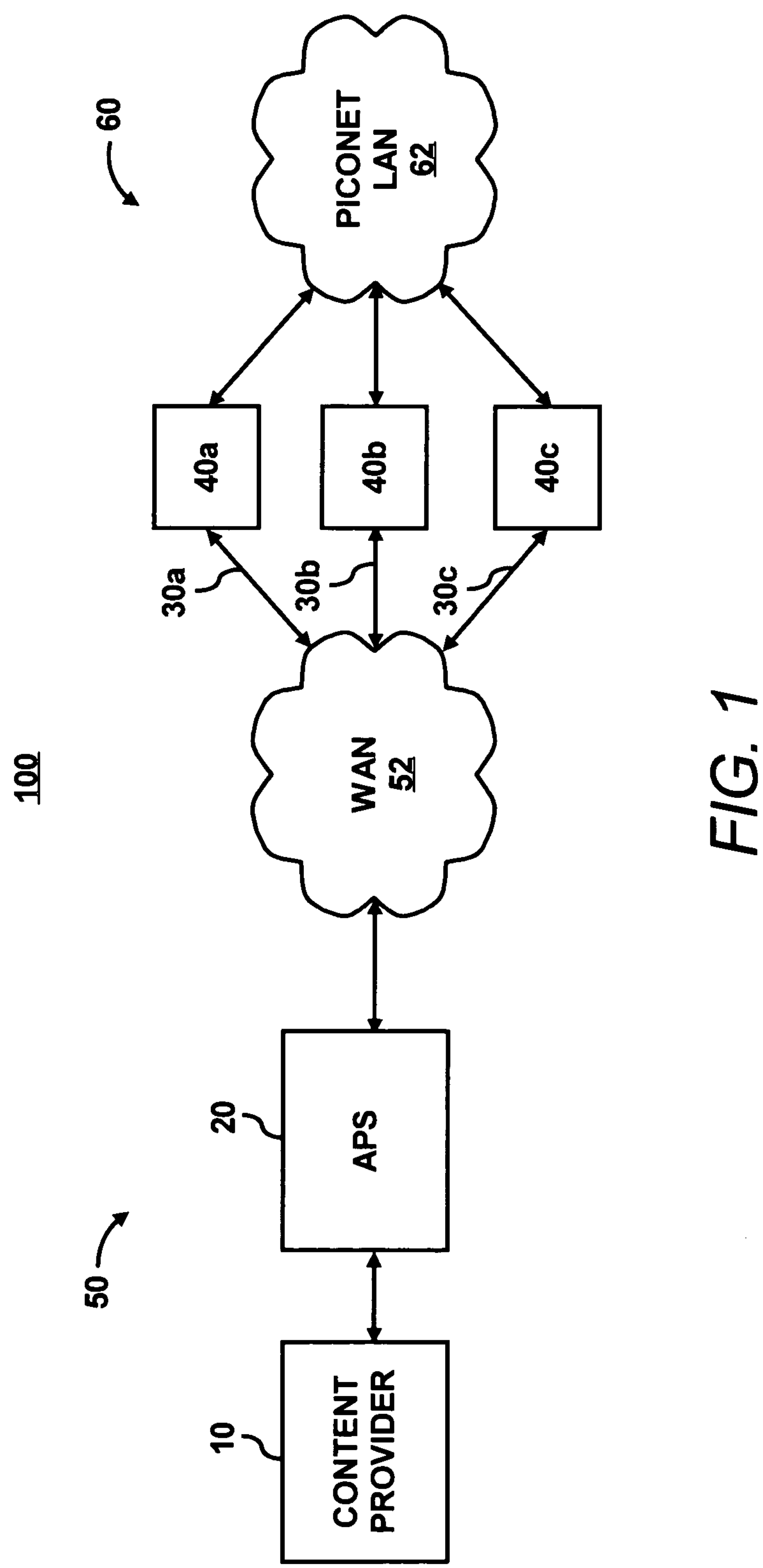
FIG. 1 illustrates a system, according to an embodiment.

FIG. 1 illustrates a system 100, according to an embodiment. The system 100 includes a WAN 50 and a piconet 60. The WAN 50 includes a content provider server 10 and an aggregation proxy server (APS) 20 connected to a piconet 50 via the WAN infrastructure 52. The WAN 50 may include the Internet and/or other public and private WANs. The content provider server 10 generates an application flow including data to be delivered to end users. Examples of the data include bulk data transfers or file transfers, real-time or non-real-time video and/or audio, etc. The application refers to the type of data provided by the content provider, e.g., file transfer, streaming video, and streaming audio, or the encoding scheme used to encode the data from the content provider.

The APS 20 inverse multiplexes, also referred to as demultiplexing, the application flow from the content provider server 20 dividing the application flow into subflows. Thus, the APS 20 receives the application flow from the content provider server 10 and generates application subflows which are transmitted on the WAN links 30 to the piconet members 40. The WAN links 30, for example, may include cellular telephony connections or Internet access service connections such as provided by an Internet service provider (ISP).

The piconet 60 includes piconet members 40 connected to the WAN 50 via WAN links 30 and connected to each other via the piconet local area network (LAN) 62. The piconet 60 is a short-range wireless network that may be operable to provide higher data rates (e.g., 1000 to 1100 kb/s) for transmission between the piconet members 40 when compared to transmission rates on the WAN links 30 (e.g., 100 kb/s).

The piconet members 40 include computer systems that have a short range high-speed piconet interface and a WAN interface, such as a cellular interface or a wired WAN interface, for communicating with the WAN 50 via the WAN links 30. The WAN interface for a piconet member is optional in that a piconet member is not required to have a WAN interface to communicate with other members in the piconet 60, but for purposes of illustrating the principles of the embodiments each of the members 40 is shown as having a connection to the WAN 50. A piconet member may include a portable computer system, such as a laptop, personal digital assistant (PDA), cellular phone, etc., which results in an ad hoc membership to the piconet 60. For example, a piconet may be deployed in a coffee shop. As a user enters the coffee shop with the portable computer system, the portable computer system connects to the piconet and becomes a member of the piconet. The piconet looses the member when the user leaves the coffee shop. Piconet members are not limited to portable computer systems and may include substantially any type of computer system with a piconet network interface and possibly a WAN interface.

The piconet 60 uses a wireless protocol to facilitate communication between the piconet members 40. Bluetooth is an example of a short-range wireless protocol that may be used in the piconet 50. Bluetooth operates at 2.45 GHz and can support up to eight simultaneous piconet members, namely one master unit and seven slave units. This type of piconet can dynamically change as users enter and leave the range of the Bluetooth master unit. Another example of a short-range wireless protocol is the wireless networking protocol IEEE 802.11x. 802.11 operates at 2.45 GHz, and an 802.11 piconet can support a very large number of users. As with Bluetooth, an 802.11 piconet can dynamically change as users enter and leave the piconet.

Regardless of the protocol used in the piconet 60, each piconet member 40 conventionally communicates with the WAN 50 at a data rate equivalent to the data rate of a single one of the WAN links 30. However, according to an embodiment, the APS 20 provides an inverse multiplexing service which allows the piconet members 40 to share each others WAN links 30 in a coordinated fashion to obtain a single, logical, high-speed WAN link. In addition, the APS 20 provides an application-aware striping service that prioritizes subflows for an application and matches the subflows to the WAN links 30 based on link characteristics for each of the WAN links 30, the priority of the subflows, and WAN link preferences for each subflow. The inverse multiplexing service and the application-aware striping service is further illustrated with respect to the data flow diagram of the system 100 shown in FIG. 2.

It will be apparent to one of ordinary skill in the art that the system 100 may include several content providers and several piconets. A single content provider and piconet are shown in FIG. 1 for purposes of describing the embodiments. Furthermore, the APS 20 may be located in one of several areas in the WAN 50. For example, the APS 20 may be located at the content provider server 10, at a service provider, or at a third party location in the WAN. An embodiment of the system 100 describing the different locations for the APS 20 and illustrating a transmission protocol for transmitting packets from the WAN 50 to the piconet 60 is described in detail below with respect to FIG. 4.

Figure 2:
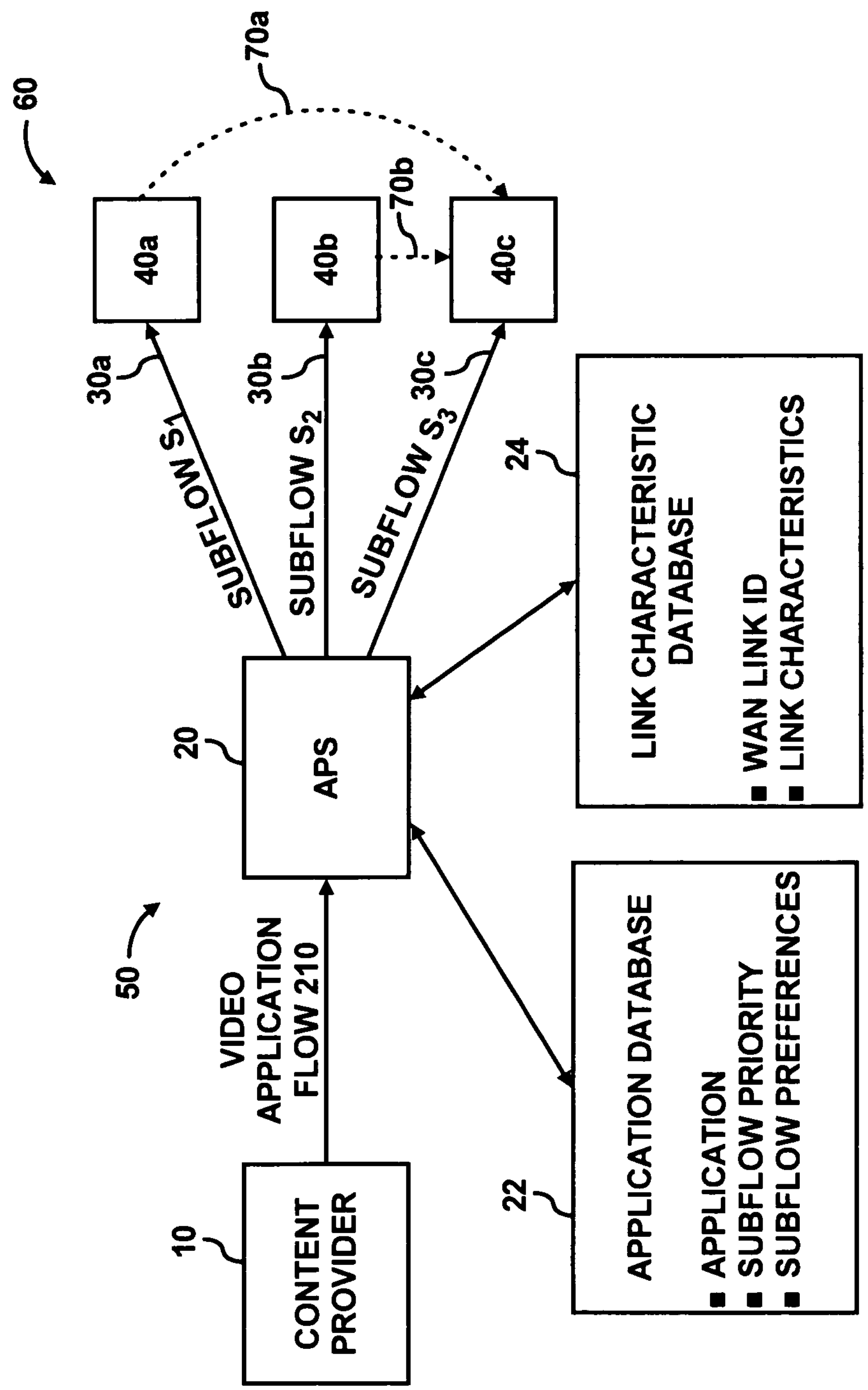
FIG. 2 illustrates data flow in the system shown in FIG. 1, according to an embodiment.

FIG. 2 illustrates application-aware striping provided by the APS 20, according to an embodiment. For each application flow, the APS 20 selects at least one of the WAN links 30 for transmitting subflows to the piconet members 40. As shown in FIG. 2, efficient WAN link allocation and striping algorithms map and/or remap the subflows s1-s3 to the WAN links 30 based on both application WAN link preferences and the WAN link characteristics, which may include the number and conditions of the available WAN links.

Using streaming video as an example in FIG. 2, the content provider sever 10 generates a video application flow 210 including the streaming video. The video application flow 210 is received by the APS 20, and the APS 20 generates subflows s1-s3 for transmission on the WAN links 30, such as by demultiplexing the video application flow 210 and assigning the subflows s1-s3 to the WAN links 30. The APS 20 prioritizes the subflows s1-s3 according to their importance to the application and matches the subflows to the WAN links 30 based on the characteristics of each of the WAN links 30 and the WAN link preferences for each subflow.

The APS 20 may use an application profile database 22 and a link characteristic database 24 to map subflows to the WAN links 30. The application profile database 22 stores application profiles for different types of applications and includes information pertaining to the characteristics of each type of application, such as application type or ID, subflows for the application type, subflow priorities, and WAN link preferences for each subflow. The WAN link preferences for each subflow, as an example, may be related to the following metrics: minimum packet interarrival time, burstiness, multiple QoS levels, bandwidth, loss rate, delay, and jitter. The WAN link preferences for a subflow may include the desired or optimum WAN link characteristics for transmitting the subflow. Each application flow may be characterized by its own features (i.e., intracharacterization) or against other application flows (i.e., intercharacterization). The information stored in the application database 22 may be associated with either type of characterization.

The APS 20 determines the application of the video application flow 210 and then uses information from the application database 22 to identify subflows for the application. For example, the content provider server 10 marks packets in the video application flow 210, such as a ToS field in the IP header, with application information identifying the application, or the APS 20 infers the application from destination information, such as TCP or UDP port numbers, or even the application payload. The APS 20 demultiplexes the video application flow 210 into the subflows specified in the application database 22 for the application type of the video application flow 210.

The APS 20 also determines the application of the video application flow 210 to identify priority information and WAN link preferences for each subflow from the application database 22. Using the priority information from the application database 22 and sensed or measured characteristics of each of the WAN links 30, which may be retrieved from the link characteristic database 24, the APS 20 maps the subflows s1-s3 to the WAN links 30 to attempt to satisfy the WAN link preferences for each subflow.

The APS 20 may store and retrieve information about the WAN links 30 from the link characteristic database 24. A two-sided channel monitor (not shown), such as a monitor at the WAN side and a monitor at the piconet side of a WAN link, may be used to sense link characteristics, such as bandwidth, error rate, latency, security, reliability, cost, etc. The monitors may also be used to sense change in membership of the piconet 60. The piconet 60 is an ad hoc network with members randomly leaving and joining the network. The link characteristic database 24 stores the membership information, such as available WAN links to the piconet 60, and the sensed link characteristics for each of the available WAN links, such as the WAN links 30. Using the information in the link characteristic database 24 and the application database 22, the APS 20 performs channel-adaptive and application-aware striping of the video application flow 210 across the WAN links 30.

The APS 20 may stripe a single application flow or multiple application flows. In the case of a single application flow, such as the video application flow 210 shown in FIG. 2, the APS 20 stripes the video application flow 210 by mapping the demultiplexed video application flow 210 into a dynamically-changing set of channels, such as described above. For example, the APS 20 demultiplexes the video application flow into a prioritized set of subflows s1-s3, wherein the priority is determined by the application characteristics. The order may be predetermined and stored in the application database 22 per application type, such as described above with respect to storing subflow priority information in the application database 22. Then, the APS 20 maps the prioritized subflows s1-s3 to a set of WAN link channels 30 based on WAN link preferences for each subflow s1-s3 and the sensed link characteristics for the WAN links 30. The WAN links 30 may also be ordered based on their relevance to the application, wherein the highest priority WAN link is best able to meet the WAN link preferences of the highest priority subflow.

In general, the APS 20 allocates as many of the highest priority WAN links 30 as necessary for transporting the highest priority subflow. For example, if the subflow s1 is the highest priority and the WAN link 30*a* is the highest priority, the subflow s1 is mapped to the WAN link 30*a*. However, if the subflow s1 requires more bandwidth than can be provided by the WAN link 30*a*, the subflow s1 is also allocated to the next highest priority WAN link, such as the WAN link 30*b*. If the subflow s1 does not require the entire bandwidth of the additional WAN link 30*b*, the remaining bandwidth of the WAN link 30*b* is assigned to additionally transport the next highest priority subflow, such as the subflow s2. A weighted round-robin (WRR) scheduling algorithm, where packet scheduling is weighted based on the bandwidth of the WAN links used to transmit the subflows, or another type of channel-adaptive scheduling algorithm, such as weighted fair queuing (WFQ), rate-monotonic (RM), or deadline scheduling, may be used to allocate bandwidth between the subflows s1 and s2. Similarly, if the highest priority subflow s1 does not require the entire bandwidth of the WAN link 30*a*, then the remaining bandwidth may be allocated to the subflow s2. Also, if there is not enough bandwidth available for transporting all of the subflows, the least important subflows may not be transported or may be partially transported depending on the type of application.

In the case where there are multiple application flows, the WAN links 30 are shared among the application flows according to the relative importance of the application flows and the WAN links' characteristics. For example, the application flows are prioritized and the WAN links 30 are allocated to the application flows similarly to the allocation of prioritized subflows for a single application to the WAN links 30 described above. Multiple application flows having the same priority may share the same WAN links using a WRR scheduling algorithm or another type of scheduling algorithm.

Channel-adaptive, application-aware striping is further described with respect to three examples of application types for the video application flow 210 shown in FIG. 2. For streaming video, the application may be based on the type of encoding algorithm used to encode the streaming video. Hierarchal layer encoding, MPEG encoding, and multiple description video encoding are three examples of applications for the video application flow 210 based on the type of encoding algorithm used to code the video application flow 210.

Hierarchal layer encoding algorithms generates a base layer £0 containing information required for decoding, and one or more optional enhancement layers (£i: i=1, . . . , n) in a hierarchical structure of cumulative layers. The reconstruction process is progressive in that an enhancement layer £k can only be used if all the sublayers £i: i=0, . . . , k−1 are available. Thus, the layer index i corresponds to the layer priority, where £0 has the highest priority.

The APS 20 determines the layer priorities, for example, by retrieving subflow priority information for the application type hierarchal layer encoding from the application database 22. The APS demultiplexes the video application flow 210 into the subflows s1-s3, where the subflow s1 having the highest priority includes packets for the base layer £0. The APS 20 maps the subflows s1-s3 based on the WAN link preferences for the layers. For example, if loss rate is an important metric, the base layer £0, which is provided in the subflow s1, is assigned to a WAN link with the lowest loss rate. The packets for each of the remaining layers £1-£n may be striped onto the remaining WAN links using a WRR scheduling algorithm. For example, if the WAN link 30*a* has the lowest loss rate, then the packets for the subflow s1 corresponding to the base layer £0 are transmitted on the WAN link 30*a*. The packets for the remaining subflows are striped on the remaining WAN links, which may include a portion of the WAN link 30*a* if the subflow s1 does not utilize the entire bandwidth of the WAN link 30*a*. If a new WAN link with higher reliability becomes available, allocation of subflows is shifted up to the WAN links with higher reliability, such as WAN links with better loss rates. Similarly, if the link with the highest reliability becomes unavailable, the allocation is shifted down.

In another example, the application type of the video application flow 210 is MPEG encoding. The priority order for frames in MPEG Group of Pictures (GoP) is I>P>B. The APS 20 generates subflows for each frame type. Similarly, to link assignment for hierarchal layer encoding, the WAN links 30 are allocated according to the subflow priority. The I-frame subflow is sent over the most reliable of the WAN links 30, and the P-frame and B-frame subflows are sent over the remaining WAN links 30, such as using a weighted round-robin packet allocation algorithm and the like.

In another example, the application type of the video application flow 210 is a multiple description video encoding algorithm, where the video application flow 201 is encoded into multiple independently decodable subflows. Information from one subflow can be used to correct the errors in another subflow. Hence, it is important for receivers, such as the members 40 of the piconet 60, to successfully receive as many complete subflows or components as possible, and it is desirable to achieve a low correlation of loss across different subflows. Thus, the APS 20 maps each subflow to a different WAN link.

After the APS stripes the video application flow 210 across the WAN links 30, portions of the video application flow 210, such as the subflows s1-s3, are received by multiple piconet members 40. The piconet members 40 then route their received portions of the video application flow 210 via the piconet 60 to the piconet member that requested the streaming video from the content provider server 10. For example, if the piconet member 40*c* requesting the streaming video from the content provider server 10, the piconet members 40*a* and 40*b* route their received portions of the video application flow 210 to the piconet member 40*c* via piconet links 70*a* and 70*b*. The piconet members 40*a* and 40*b* may identify the destination, i.e., the piconet member 40*c*, of their received portions of the video application flow 210 from information provided in packets headers of the received subflows or the APS 20 may inform the piconet members 40*a* and 40*b* of the destination. The piconet member 40*c* then reconstructs the streaming video for its user.

Figure 3:
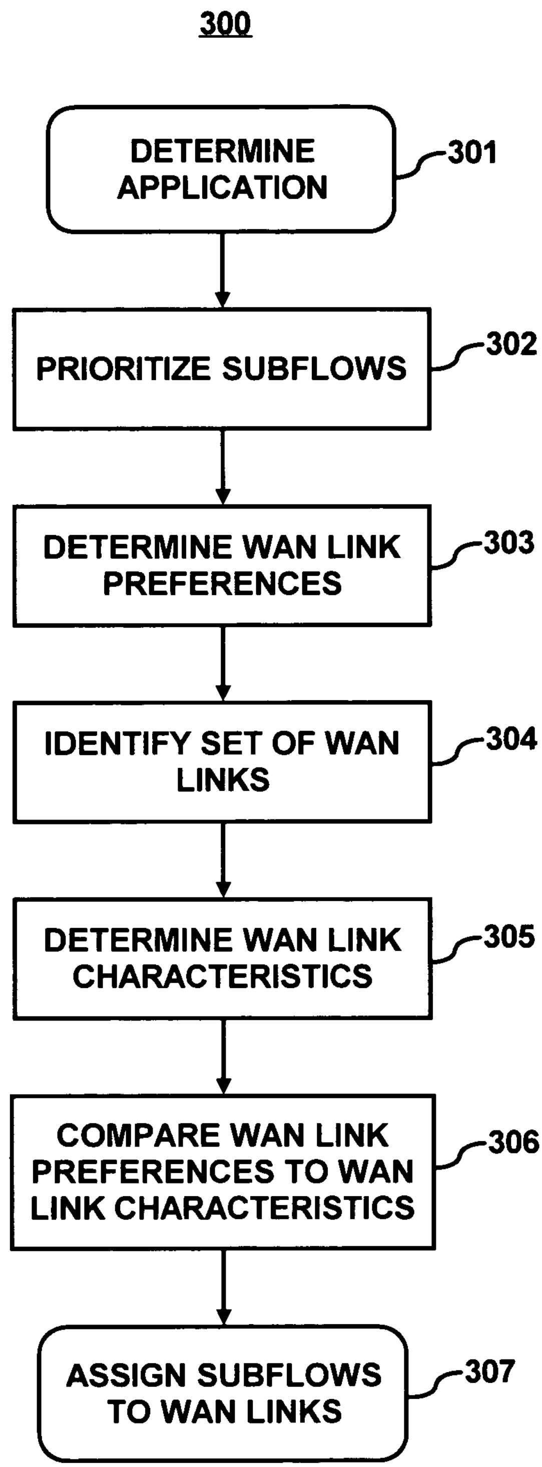
FIG. 3 illustrates a flow chart for application-aware striping, according to an embodiment.

FIG. 3 illustrates a flow chart 300 for application-aware striping, according to an embodiment. The method 300 is described with respect to the system 100 shown in FIGS. 1 and 2 by way of example and not limitation. Furthermore, one or more of the steps of the method 300 may be performed by software, hardware or a combination thereof.

At step 301, the APS 20 determines the application associated with a received application flow. For example, the APS 20 receives the video application flow 210. The APS determines that the application of the video application flow 210 is a hierarchal layer encoding application from, for example, information in a packet header, information identifying the application previously received from the content provider server 10, or based on the destination or payload of the packets.

At step 302, the APS 20 prioritizes the subflows for the video application flow 210, and at step 303 the APS 20 determines WAN link preferences for each subflow. For example, the APS 20 retrieves subflow information for the application identified at step 301 from the application database 22. The subflow information may include the priority of each subflow and the WAN link preferences for each subflow. The WAN link preferences may include a desired loss rate, bandwidth, delay, jitter, etc., for each subflow. If a subflow is characterized using a token bucket model, the WAN link preferences may also include average token drain rate and bucket size. If a subflow is characterized using a linear bounded arrival process, the WAN link preferences may also include minimum or average time separation between two consecutive packets, maximum packet size, and maximum burst size. Also, the WAN link preferences may identify which preference or preferences are most important to the application flow or most important to each subflow. For example, for real-time streaming video, preferences such as delay and jitter may be more important than loss rate. Thus, a high priority subflow may be assigned to the WAN link with the best delay and jitter characteristics.

At step 304, the APS 20 identifies a set of WAN links for transmitting the subflows to the piconet 60. For example, using WAN link monitors at one or both ends of the WAN link, the APS 20 determines which WAN links are available for transmitting information to the piconet 60. If more than one set of WAN links are available, the set of WAN links with the highest estimated throughput may be selected.

Throughput may be estimated as a function of bandwidth, i.e., transmission rate, round trip time, and loss probabilities. For example, assume throughput is being determined for a bulk data transfer via TCP, and the available links in the set of WAN links and their WAN link characteristics will persist over the lifetime of the transfer. The maximum throughput of the set of WAN links may be estimated using equation 1 below.

$$T(\vec{S}, \vec{p}, \vec{R}) \leq \sum_{i=1}^{N} \frac{C_i B}{R_i \sqrt{p_i}} \quad \text{Equation 1}$$

In Equation 1, the maximum throughput "T" for the WAN links i=1 . . . N is estimated using round-trip times "R", packet loss probabilities "p", identical packet lengths "B", and a constant "C" directly proportional to a link's congestion window size. Equation 1 generally combines the maximum throughput of each link in the set of links to determine the combined throughput. However, the throughput of each link may be smaller than the maximum throughput in each link due in part to additional delays caused for example by remultiplexing delays and longer packet transmission delays on component links.

As an example, assume the APS 20 selects from transmitting the application video flow 210 on a single WAN link having a transmission speed S with loss probability ph and a set of n WAN links transmitting the demultiplexed video application flow 210, wherein each of the n WAN links has a transmission speed of S/n. Relative to the single link with the transmission speed D, packets of length B bits traversing any one of the n links suffer an additional (n−1)B/S seconds of transmission delay, and an average of (n−1)/2(B/S) remultiplexing delay. Assuming the round-trip times R are the same, the maximum throughput for the set of WAN links taking into consideration the additional delays maybe calculated using equation 2.

$$T(\vec{S}, \vec{p}, \vec{R}) \leq \sum_{i=1}^{N} \frac{1}{R + \frac{3(N-1)}{2}\frac{B}{S}\sqrt{p_i}} \quad \text{Equation 2}$$

At step 305, the APS 20 determines WAN link characteristics for each link in the identified set of WAN links. A two-sided channel monitor, such as a monitor at the WAN side and a monitor at the piconet side of a WAN link, may be used to measure or detect link characteristics, such as bandwidth, error rate, delay, jitter, security, reliability, cost, etc. The monitors may also be used to sense change in membership of the piconet 60. The piconet 60 is an ad hoc network with members randomly leaving and joining the network. The link characteristic database 24 stores the membership information, such as available WAN links to the piconet 60, and the sensed link characteristics for each of the available WAN links, such as the WAN links 30. The set of WAN links may also include persistent links that are generally not transient, such as a WAN link connected to a non-mobile computing device in the piconet 60.

At step 306, the APS 20 compares the WAN link preferences for each subflow to the WAN link characteristics determined at step 305. For example, the APS 20 identifies the highest priority subflow, e.g., the subflow s1 shown in FIG. 2, and determines the WAN link preferences for the subflow s1. Then, the APS 20 identifies the WAN link having characteristics that best match the preferences for the subflow s1. For example, if a WAN link preference for the subflow s1 is minimum delay. Then, the APS 20 identifies a WAN link, e.g., the WAN link 30*a* shown in FIG. 2, having the lowest delay. Best WAN link matches for the remaining subflows s2 and s3 are also identified. For example, if the subflow s2 also has a minimum delay WAN link preference, then the subflow s2 or a portion of the subflow s2 may also be transmitted on the WAN link 30*a*. If no bandwidth is available on the WAN link 30*a*, then the subflow s2 is transmitted on the next best match, e.g., one of the WAN links 30*b* or 30*c* having characteristics that best match the preferences for the subflow s2. If some bandwidth is available on the WAN link 30*a* but not enough to transmit both the subflows s1 and s2, a portion of the subflow s2 may be transmitted on the WAN link 30*a* and a portion may be transmitted on the next best match. A WRR scheduling algorithm, where the weights of the two sub flows s1 and s2 are determined based on the bandwidth requirements of the subflows, or another type of channel-adaptive scheduling algorithm, such as WFQ, RM, or deadline scheduling, may be used to allocate bandwidth between the subflows s1 and s2 on the WAN link 30*a*. Also, the WAN link characteristics may be retrieved from the WAN link characteristic database 24 to match WAN link preferences with WAN link characteristics.

At step 307, the APS 20 demultiplexes the application flow into the subflows and assigns the subflows to the WAN links based on the comparison at step 306. For example, the subflow s1 is assigned to the WAN link 30*a* having WAN link characteristics that best match the WAN link preferences of the subflow s1. The subflows s2 and s3 are also similarly assigned to WAN links.

It will be apparent to one of ordinary skill in the art that at least some of the steps of the method 300 may be performed in a different order or substantially simultaneously. For example, the APS 20 may retrieve WAN link characteristics from the link characteristic database 24 and WAN link preferences may be retrieved from the application database substantially simultaneously or in any order. These and other steps may be performed in different orders. Also, the method 300 includes steps for striping an application flow onto WAN links. In some situations the APS 20 may receive multiple application flows. If the APS 20 is operable to receive multiple application flows, the APS 20 may prioritize the application flows. The priority of application flows may be predetermined and stored in the application database 22. The highest priority application flow is demultiplexed first according to the steps of the method 300, and each remaining application flow is demultiplexed based on the order of priority and in accordance with the method 300.

As described above, the APS 20 shown in FIGS. 1 and 2 may be provided at different locations in the WAN 50, such as at the content provider server 10, at another server connected to the content provider server 10, or at a service provider which provides connections for the piconet members 40 to the WAN 50, which may include the Internet. Also, several transmission protocols may be used to transmit the subflows to the piconet members 40 via the WAN links 30. According to an embodiment, generic routing encapsulation (GRE) is used to transmit packets carrying information for the subflows to the piconet members 40.

Figure 4:
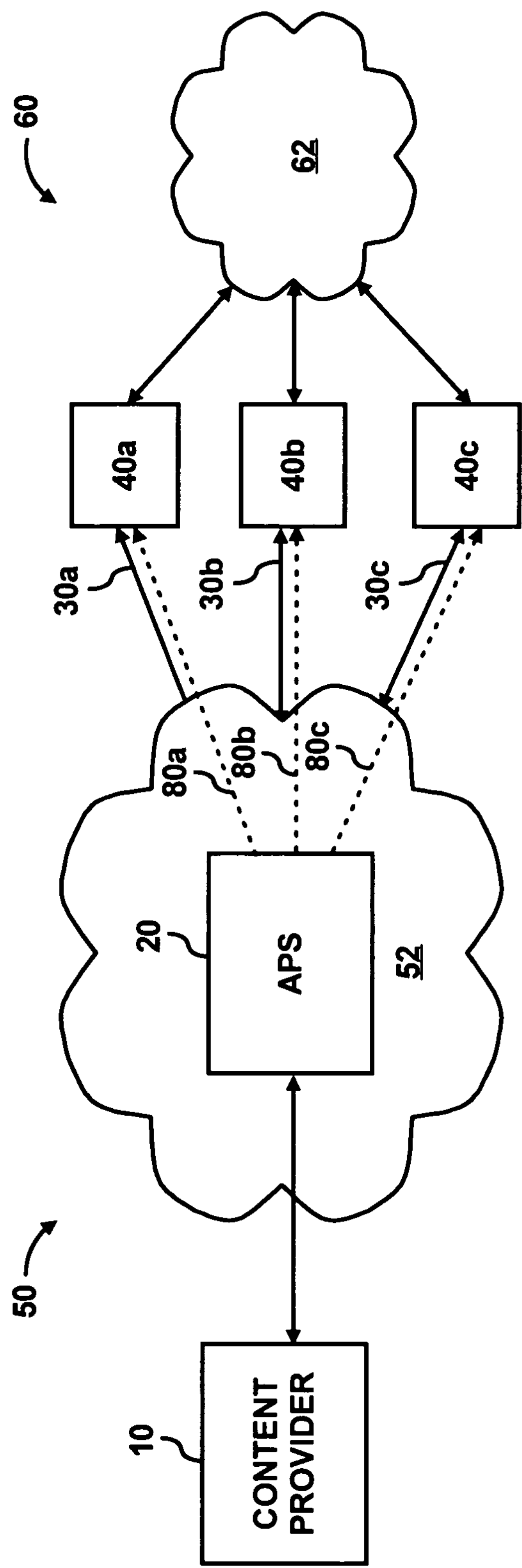
FIG. 4 illustrates another embodiment of the system shown in FIG. 1.

FIG. 4 illustrates using GRE tunnels 80 to create channels between the APS 20 and the piconet members 40. The GRE tunnels 80 are substantially static paths from the APS 20 to the piconet members 40. The GRE tunnels 80 include the WAN links 30. By using a GRE tunnel, channel characteristics, such as WAN link characteristics for the WAN links 30 may be measured and used to assign the WAN links 30 to application subflows, such as described in the method 300 shown in FIG. 3. For example, using a GRE tunnel, a packet traverses the same path between the APS 20 and a piconet member. Thus, round-trip time, packet loss, jitter, and other WAN link characteristics can be measured along the same path.

Packet routing is performed by encapsulating an IP packet with a GRE header. The GRE header includes routing information for routing the packet in the WAN 50. The routing information is provided in fields, such as an address family field, a source route entry offset field and a source route entry length fields. These fields are used to identify destinations addresses of nodes in the WAN 50, such that packets with the same GRE routing information are routing along the same path creating a GRE tunnel.

When a GRE routed packet reaches a piconet member (e.g., the piconet member 40*a*), the piconet member 40*a* de-encapsulates the packet to identify a destination address of the packet (e.g., the address of the piconet member 40*c*). The piconet member 40*a* then routes the packet via the piconet LAN 62 to the piconet member 40*c*. GRE firmware is widely deployed in network devices, and thus little or no overhead may be required to implement a GRE transmission protocol. GRE is one example of a transmission protocol. Other transmission protocols may be used, such as loose source routing, however other protocols may require substantially more overhead and deployment.

The APS 20 is shown in FIG. 4 as located in the WAN infrastructure 52 to illustrate the use of GRE tunneling. As described above, the APS 20 may be located at substantially any location between the content provider server 10 and the endpoint of the WAN links 30.

Figure 5:
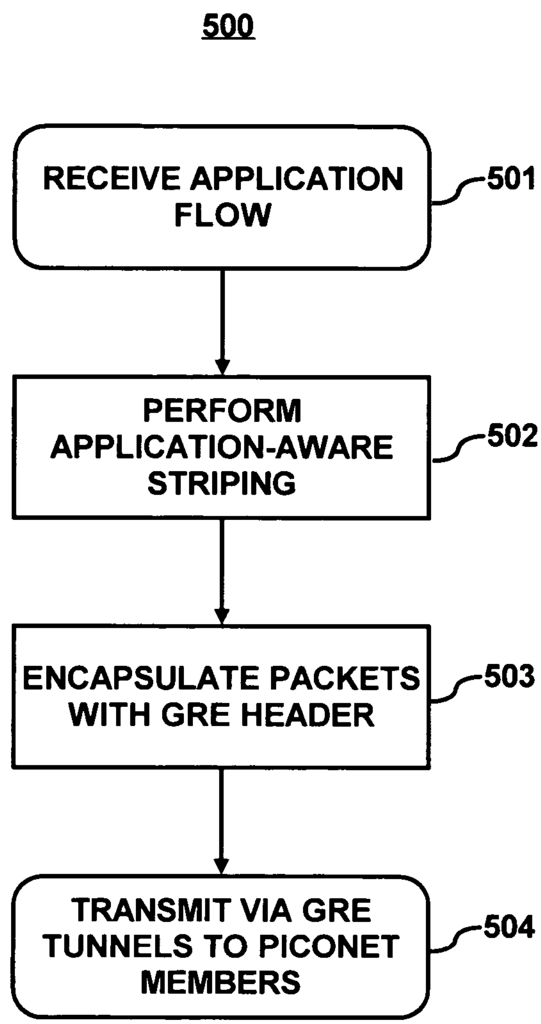
FIG. 5 illustrates a flow chart of a method for transmitting packets in the system shown in FIG. 4, according to an embodiment.

FIG. 5 illustrates a flow chart of a method 500 for using a GRE transmission protocol in the system 100. The method 500 is described with respect to the system 100 shown in FIG. 4 by way of example and not limitation. Furthermore, one or more of the steps of the method 500 may be performed by software, hardware or a combination thereof.

At step 501, the APS 20 receives an application flow. At step 502, the APS 20 performs application-aware striping on the received application flow. Step 501 may include some or all of the steps in the method 300 to perform application-aware striping, such as described in detail with respect to FIG. 3. Generally, the application flow is demultiplexed into subflows. The subflows are assigned to the WAN links 30 based on WAN link preferences for the subflows and WAN link characteristics for the WAN links 30. The WAN link preferences are associated with the application of the subflow.

At step 503, the APS 20 encapsulates packets for the subflows with a GRE header that includes routing information for routing the packets via the GRE tunnels 80 to the piconet members 40. At step 504, the APS 20 transmits the packets to the piconet members 40 via the GRE tunnels 80.

Figure 6:
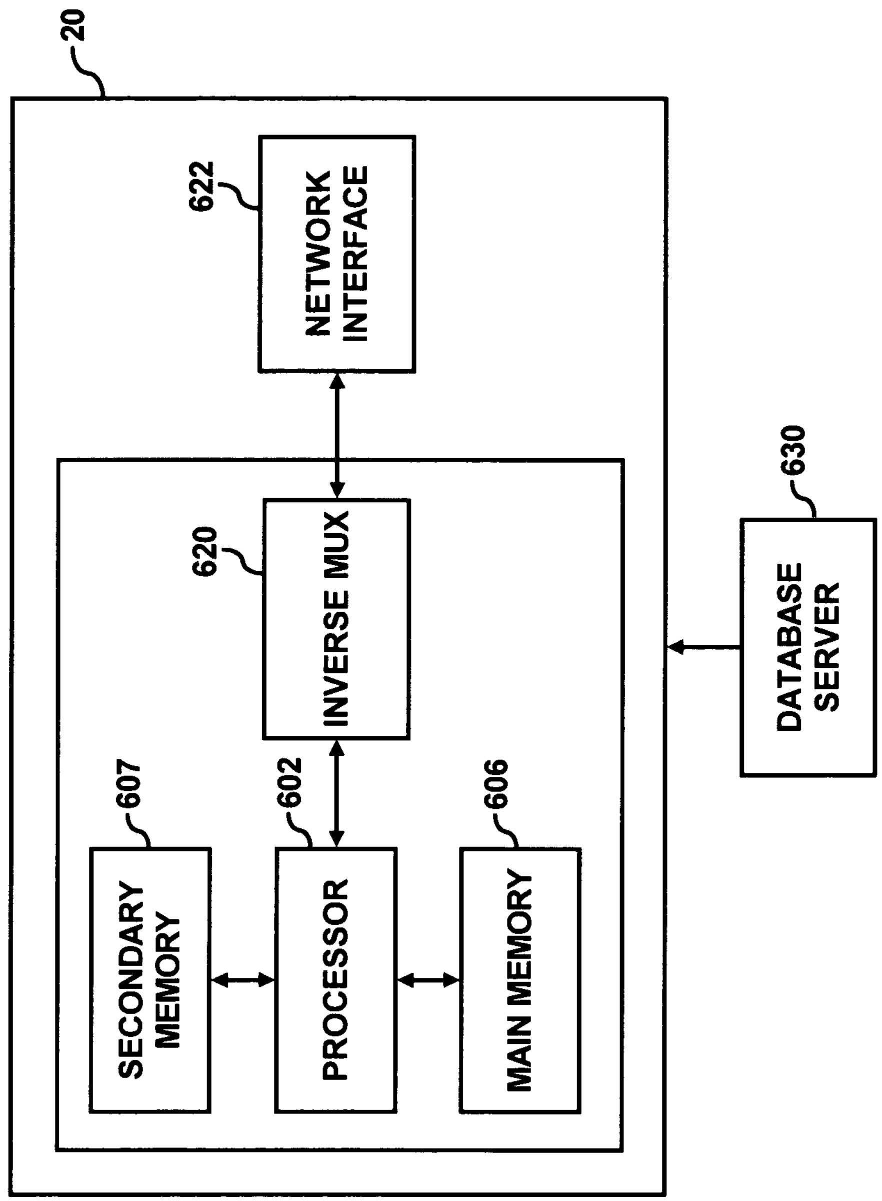
FIG. 6 illustrates an aggregation proxy server, according to an embodiment.

FIG. 6 illustrates a block diagram of the APS 20 shown in FIGS. 1, 2, and 4. The APS 20 includes one or more processors, such as processor 602. The APS 20 also includes a main memory 606, such as a random access memory (RAM), where program code for performing application-aware striping and GRE encapsulation may be executed during runtime, and a secondary memory 607. The secondary memory 607 includes, for example, one or more hard disk drives 610.

An inverse multiplexor 620 is connected to the processor 602. The inverse multiplexor receives an application flow, for example from the content provider server 10 shown in FIGS. 1, 2, and 4, via the network interface 622 and demultipixes the application flow into subflows. The processor 602 instructs the inverse multiplexor 620 as to the assignment of the subflows to the WAN links 30. The method 300 describes the steps for assigning subflows to the WAN links 30. The inverse multiplexor 620 encapsulates packets for the sub flows with a GRE header and transmits the packets via the network interface 622 to the piconet members through the GRE tunnels 80 shown in FIG. 4. Also, the processor 602 and/or other hardware may measure WAN link characteristics for the WAN links 30, such as delay, jitter, bandwidth, etc.

The inverse multiplexor 620 may be connected to the network interface 622 for transmitting the subflows on the WAN links 30. The network interface 622 is operable to both receive and transmit data via the WAN 50. The inverse multiplexor 620 may include a packet generator (not shown) generating packets for the subflows to be transmitted on the WAN links 30 to the piconet 60. In one example, the packet generator is operable to encapsulate the packets with a GRE header. In this example, the packets are transmitted via GPE tunnels to the piconet 50, such as shown in FIG. 4.

One or more of the steps of the methods 300 and 500 may be implemented as software embedded on a computer readable medium, such as the memory 606 and/or 608. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described herein, those skilled in the art will be able to make various modifications to the described embodiments without departing from their true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of assigning subflows of an application flow to a plurality of communication links, the method comprising:

receiving a highest priority application flow to be transmitted to a first device in a network;

dividing the highest priority application flow into highest priority application subflows;

determining communication link preferences for the highest priority application subflows;

determining characteristics of communication links operable to transmit the highest priority application subflows;

comparing the communication link preferences to the communication link characteristics;

selecting a set of communication links based on the comparison, wherein the set of communication links is connected to a plurality of devices in the network that contains the first device;

assigning the highest priority application subflows to the selected set of communication links to transmit the highest priority application subflows to the first device over the selected set of communication links;

receiving a next highest priority application flow;

dividing the next highest priority application flow into next highest priority application subflows;

determining communication link preferences for each of the next highest priority application subflows;

comparing the communication link preferences for each of the next highest priority application subflows to communication link characteristics of communication links operable to transmit the next highest priority application subflows;

selecting a next set of communication links based on the comparison; and assigning the next highest priority application subflows to the next set of communication links wherein the next highest priority application subflows are to be transmitted to the first device in the network on the next set of communication links.

2. The method of claim 1, comprising:

transmitting each subflow of the highest priority flow on the assigned communication link.

3. The method of claim 1, wherein determining communication link preferences comprises:

identifying an application associated with the highest priority application flow; and determining communication link preferences based on the identified application.

4. The method of claim 3, wherein the communication link preferences comprise communication link preferences for each highest priority application flow subflow.

5. The method of claim 3, comprising:

prioritizing the highest priority application subflows based on the application; and wherein assigning the highest priority application subflows to the selected set of communication links comprises assigning a highest priority subflow to a communication link having determined characteristics that best match the communication link preferences for the highest priority subflow.

6. The method of claim 5, wherein assigning the highest priority application subflows to the selected set of communication links comprises:

determining whether any bandwidth on the communication link assigned to the highest priority subflow is available;

using a scheduling algorithm to schedule transmission of packets for the highest priority subflow and a next highest priority subflow on the communication link assigned to the highest priority subflow in response to determining that bandwidth on the communication link assigned to the highest priority communication link is available; and identifying a best match communication link, not including the communication link assigned to the highest priority subflow, for the next highest priority subflow in response to determining that bandwidth on the communication link assigned to the highest priority communication link is not available.

7. The method of claim 1, wherein determining communication link characteristics of communication links operable to transmit the highest priority application subflows comprises:

measuring the communication link characteristics of the communication links operable to transmit the highest priority application subflows.

8. The method of claim 1, dividing the highest priority application flow into subflows comprises:

demultiplexing the highest priority application flow into the highest priority application subflows.

9. The method of claim 1, comprising:

identifying at least two sets of communication links operable to transmit the highest priority subflows to the first device in the network;

estimating a throughput of each set of communication links; and selecting one of the at least two sets of communication links having a greater throughput to transmit the highest priority subflows.

10. The method of claim 9, wherein estimating a throughput of each set of communication links comprises:

estimating the throughput based on at least one of round-trip time, bandwidth, loss probabilities, and packet lengths.

11. The method of claim 10, wherein estimating a throughput of each set of communication links comprises:

estimating the throughput based on at least one of transmission delay for each link and remultiplexing delay.

12. A method of striping application flows across a plurality of communication links, the method comprising:

receiving application flows;

prioritizing the application flows;

selecting a highest priority application flow to be transmitted to a first device in the network;

dividing the highest priority application flow into highest priority application subflows;

determining communication link preferences for each of the highest priority application subflows;

determining communication link characteristics for the plurality of communication links;

comparing the communication link preferences to the communication link characteristics;

selecting a first set of communication links based on the comparison, wherein the first set of communication links is connected to a plurality of devices in the network that contains the first device;

assigning the subflows to the first set of communication links to transmit the highest priority application subflows to the first device over the first set of communication links;

selecting a next highest priority application flow of the prioritized application flows;

dividing the next highest priority application flow into a next highest priority application subflows;

determining communication link preferences for each of the next highest priority application subflows;

comparing the communication link preferences for each of the next highest priority application subflows to the communication link characteristics;

selecting a next set of communication links based on the comparison; and assigning the next highest priority application to the next set of communication links wherein the next highest priority application subflows are to be transmitted to the first device in the network on the next set of communication links.

13. The method of claim 12, comprising:

transmitting each highest priority application subflow on the assigned communication link.

14. The method of claim 12, wherein determining communication link preferences for each of the highest priority application subflows comprises:

identifying an application associated with the highest priority application flow; and determining communication link preferences for each of the highest priority application subflows based on the identified application.

15. The method of claim 14, comprising:

prioritizing the highest priority application subflows based on the application; and wherein assigning the highest priority application subflows to the selected set of communication links comprises assigning a highest priority subflow to a communication link having determined characteristics that best match the communication link preferences for the highest priority subflow.

16. An apparatus comprising:

a processor to prioritize application flows, determine communication link preferences for subflows of a highest priority application flow and subflows of a next highest application flow of the prioritized flows, determine communication link characteristics of a set of communication links for each of the highest priority application subflows and the next highest priority application subflows;

an inverse multiplexer to receive the highest priority application flow to be transmitted in a network, divide the highest priority application flow into the highest priority application subflows wherein the highest priority application subflows are assigned to the set of communication links having communication link characteristics that best match the communication link preferences of the highest priority application subflows, and receive the next highest priority application flow to be transmitted in the network, divide the next highest priority application flow into the next highest priority application subflows wherein the next highest priority application subflows are assigned to the set of communication links having communication link characteristics that best match the communication link preferences of the next highest priority application subflows; and an interface to transmit the highest priority application subflows and the next highest priority application subflows in the network on the corresponding assigned communication links.

17. The apparatus of claim 16, comprising:

an application preference storage unit for storing communication link preferences associated with a plurality of applications, wherein the processor is operable to retrieve the communication link preferences for the highest priority and next highest priority application flows from the application storage unit.

18. The apparatus of claim 16, comprising:

a link characteristic storage unit to store communication link characteristics for the set of communication links, wherein the processor is operable to retrieve the communication link characteristics of the set of communication links for each of the highest priority application subflows and the next highest priority application subflows from the link characteristic storage unit.

19. The apparatus of claim 16, comprising:

a sensor to measure the communication link characteristics of the set of communication links for each of the highest priority application subflows and the next highest priority application subflows.

20. The apparatus of claim 16, wherein the communication link preferences of the subflows of the highest priority application flow and the next highest application subflows are associated with an application of the application flow.

21. A non-transitory computer readable medium storing machine readable instructions that when executed by a computer cause the computer to:

divide a highest priority application flow into highest priority application subflows, wherein the application flow is to be transmitted in a network;

determine communication link preferences for the highest priority application subflows;

determine characteristics of communication links operable to transmit the highest priority application subflows;

compare the determined communication link preferences to the determined communication link characteristics;

select a set of communication links based on the comparison, wherein the set of communication links is connected to a plurality of devices in the network; and the highest priority application subflows to the selected set of communication links to transmit the subflows to the first device over the selected set of communication links;

dividing a next highest priority application flow into next highest priority application subflows;

determining communication link preferences for each of the next highest priority application subflows;

comparing the communication link preferences for each of the next highest priority application subflows to communication link characteristics of communication links operable to transmit the next highest priority application subflows;

selecting a next set of communication links based on the comparison; and assigning the next highest priority application subflows to the next set of communication links wherein the next highest priority application subflows are to be transmitted in the network on the next set of communication links.

22. The non-transitory computer readable medium of claim 21, wherein the machine readable instructions to determine communication link preferences comprises machine readable instructions to:

identify a highest priority application for the highest priority application flow; and determine the communication link preferences for the highest priority application subflows based on the identified application.

23. The non-transitory computer readable medium of claim 22, wherein the machine readable instructions executable to:

prioritize the highest priority application subflows based on the highest priority application; and assign a highest priority subflow to a communication link having determined characteristics that best match the communication link preferences for the highest priority subflow.

24. The non-transitory computer readable medium of claim 21, wherein the machine readable instructions are executable to:

identify at least two sets of communication links operable to transmit the highest priority application subflows in the network;

estimate a throughput of each set of communication links; and select one of the at least two sets of communication links having a greater throughput to transmit the highest priority application subflows.

25. The non-transitory computer readable medium of claim 21, wherein the communication link preferences for the highest priority application subflows are associated with an application of the highest priority application flow.

26. A method of transmitting an application flow across a communication, the method comprising:

receiving a highest application flow to be transmitted to a first device in a network;

dividing the highest application flow into highest priority application subflows;

assigning the highest priority application subflows to communication links based on communication link preferences for the highest priority application subflows and based on characteristics of the communication links, wherein the communication links are connected to a plurality of devices in the network that contains the first device;

encapsulating packets generated from the subflows with a general routing encapsulation (GRE) header;

transmitting the packets to the first device in the network on the assigned communication links;

receiving a next highest application flow to be transmitted to the first device in the network;

dividing the next highest application flow into next highest priority application subflows;

assigning the next highest priority application subflows to communication links based on communication link preferences for the next highest priority application subflows and based on characteristics of the communication links;

encapsulating packets generated from the next highest priority application subflows with the GRE header; and transmitting the packets for the next highest priority application subflows to the first device in the network on the assigned communication links for the next highest priority application subflows.

27. The method of claim 26, wherein assigning the highest priority application subflows comprises:

determining the communication link preferences for the highest priority application subflows based on an application associated with the highest priority application subflows.

28. The method of claim 26, wherein assigning the highest priority application subflows comprises:

prioritizing the highest priority application subflows; and assigning the highest priority application subflows to the communication links based on the priorities of the highest priority application subflows.

29. The method of claim 26, wherein transmitting the packets for the highest priority application subflows on the assigned communication links comprises:

transmitting the packets for the highest priority application subflows to the first device in the network via GRE tunnels, the GRE tunnels including the communication links for the highest priority application subflows.

30. An apparatus comprising:

a processor to prioritize application flows, determine communication link preferences for subflows of a highest priority application flow and subflows of a next highest application flow of the prioritized flows, determine communication link characteristics of a set of communication links for each of the highest priority application subflows and the next highest priority application subflows;

an inverse multiplexer to receive the highest priority application flow to be transmitted in a network, divide the highest priority application flow into the highest priority application subflows wherein the highest priority application subflows are assigned to the set of communication links having communication link characteristics that best match the communication link preferences of the highest priority application subflows, and receive the next highest priority application flow to be transmitted in the network, divide the next highest priority application flow into the next highest priority application subflows wherein the next highest priority application subflows are assigned to the set of communication links having communication link characteristics that best match the communication link preferences of the next highest priority application subflows; and a packet generator generating packets for the highest priority application subflows and the next highest priority application subflows and encapsulating the packets with a general routing encapsulation (GRE) header for transmission on the corresponding communication links.

31. The apparatus of claim 30, comprising:

a transmitter transmitting the highest priority application subflows and the next highest priority application subflows on the assigned communication links.

32. The apparatus of claim 30, wherein the processor is to retrieve at least one of the communication link preferences and the communication link characteristics for the highest priority application subflows and the next highest priority application subflows from a database.

33. The apparatus of claim 30, wherein the apparatus is located at one of a content provider, an Internet service provider, and a third-party service provider.

* * * * *